US007500377B2

(12) United States Patent
Sutton et al.

(10) Patent No.: US 7,500,377 B2
(45) Date of Patent: Mar. 10, 2009

(54) TOOL FOR CALIBRATING GRANULAR DISPENSERS AND METHOD INCORPORATING THE SAME

(75) Inventors: Douglas Arthur Sutton, Bloomington, IL (US); Daniel Kidder, Greensboro, NC (US)

(73) Assignee: Syngenta Crop Protection, Inc., Greensboro, NC (US)

(*) Notice: Subject to any disclaimer, the term of this patent is extended or adjusted under 35 U.S.C. 154(b) by 0 days.

(21) Appl. No.: 11/689,183

(22) Filed: Mar. 21, 2007

(65) Prior Publication Data

US 2007/0220948 A1 Sep. 27, 2007

Related U.S. Application Data

(60) Provisional application No. 60/784,184, filed on Mar. 21, 2006.

(51) Int. Cl.
*G01F 19/00* (2006.01)

(52) U.S. Cl. ........................................................ 73/1.74

(58) Field of Classification Search ................... 73/1.74
See application file for complete search history.

(56) References Cited

U.S. PATENT DOCUMENTS 2,678,145 A * 5/1954 Juzwiak et al. ............. 222/609
4,180,184 A * 12/1979 Florer et al. .................. 222/41

OTHER PUBLICATIONS

"M.K. Rittenhouse & Sons Ltd. Web site Materials" obtained from www.rittenhouse.ca/, provided by M.K. Rittenhouse & Sons Ltd., 1402 Fourth Ave, R.R. #3, St. Catherine's ON, Canada, L2R 6P9.

* cited by examiner

*Primary Examiner*—Robert R Raevis
(74) *Attorney, Agent, or Firm*—Rebecca Howard

(57) ABSTRACT

A tool is provided that is adapted to calibrate a dispenser operative to dispense a selected granular material received from the interior of a receptacle. The tool may include a handle extending longitudinally from a first handle end to a second handle end along a longitudinal axis and a positioning element located proximately to the second handle end. The positioning element is adapted to locate the flow control member associated with the dispenser at a selected position thereby to set a desired delivery rate of the granular material. The positioning element may be formed as an elongate projection extending upwardly from a location proximate to the second handle end or as a flat blade. A set of tools is also provided such that the dispenser can be set at alternative desired delivery rates. A method of calibrating the delivery rate of a dispenser is also provided.

20 Claims, 8 Drawing Sheets

650
660
668
666
664
652
658
$d_2$ 650
668
660
664
656
654
666
662
652
L 550
560
568
566
564
552
558
$d_1$ 550
568
560
564
556
566
562
552
554
L

TOOL FOR CALIBRATING GRANULAR DISPENSERS AND METHOD INCORPORATING THE SAME

FIELD OF THE INVENTION

The present invention generally relates to agricultural equipment. In particular, the present invention concerns granular material dispensers that are associated with large-scale farming equipment. Specifically, the present invention relates to a tool or a set of tools useful for calibrating dispensers that dispense, for example, chemicals formulated as granules from hoppers. The present invention also concerns a method of calibrating granular chemical dispensers.

BACKGROUND OF THE INVENTION

Farm equipment has evolved significantly over time to enable farmers to grow mass quantities of food while making efficient use of time and agricultural land. Centuries ago, farming was very labor intensive and families typically lived on small farms using domesticated animals and simple tools to prepare the land and plant crops. The long hours in the field during these times generally resulted in low product yields. Over time, horse powered farming equipment was replaced by steam powered tractors and ultimately by gasoline and diesel powered tractors, which are still primarily used today. Today, farming has advanced into an integrated system of specialized farming equipment, science, and computers, which has greatly reduced the amount of labor needed to produce large quantities of food and other crops on limited land area.

The marriage of farming and science has enabled farmers to vastly increase crop yields from fewer acres while reducing labor requirements. Pesticides, such as herbicides, insecticides, fungicides, rodentcides, and nematicides are used to control or destroy unwanted pests such as weeds, insects, disease, rodents, and nematodes that decrease crop yields. Pesticides are generally in a liquid, suspension, or solid form. The type of pesticide used and method of application can vary for any number of reasons, such as geography, the type of crop grown, time of application, and the pest to be controlled. For large-scale farming needs, pesticides that are in liquid form are commonly applied directly onto the cropland or crops by motorized sprayers mounted on or pulled by a tractor or an aircraft. Granular pesticides, on the other hand, are commonly delivered directly onto or into the soil to control pests living on or underneath the soil surface.

The proper application of pesticides is critical to ensuring optimum crop yields. Overapplication of pesticides is not only a financial loss, but also may result in adverse effects to the soil and surrounding ecology, and harm to the crops that farmers desire to protect. Similarly, under application may not sufficiently protect the crops from pests, resulting in reduced crop yield and sub-optimum land utilization. Accordingly, it is important that pesticides be applied using applicators capable of uniformly delivering the chemical at an accurate rate to insure that the optimum amount is released to the target area. Consequently, a variety of liquid and granular applicators, from large power driven equipment to hand-held equipment, have been designed for applying the pesticides to meet the needs of farmers.

At planting time, spreaders are commonly used for applying granular pesticides such as fungicides, herbicides and insecticides for large-scale farming needs. Generally, conventional planter-spreaders are comprised of a plurality of individual planter units each carrying a hopper having a chemical metering device for dispensing the granular pesticide. The pesticide granules are held in the hopper and flow by gravity into the chemical metering device and then are dispensed through an aperture in the meter.

There are a number of variables that affect the rate at which the granular pesticides are delivered to a target area. For example, the size of the meter aperture can significantly increase or decrease the delivery rate. The size that the meter aperture is set to is also dependent upon the size of the individual granules of the product. Also, the speed at which the spreader travels affects total output per unit area. When speed increases, less material is applied per unit area, and when speed is reduced, more material is applied.

Since each granular pesticide has unique flow characteristics, each chemical meter must be individually calibrated to ensure that the equipment uniformly applies the correct amount of the product. Calibration is simply determining the amount of material dispensed from the spreader over a known area at a known speed. In an effort to assist the proper calibration of the granular meters, pesticide manufacturers usually include charts or tables on the labels of their products that provide recommended meter settings for specific spreaders at various speeds. However, the manufacturer's recommended rates are based on new equipment and farmers strive to improve the accuracy of the application rates especially since granular pesticides are becoming more concentrated and expensive in recent years. Further, since granular products are abrasive, wear and tear on the equipment can be substantial, causing inaccurate delivery rate settings as equipment is repeatedly used over time.

For these reasons, then, many farmers use the recommended settings as a starting point and calibrate each individual meter through a common, time consuming trial and error method. This method typically involves filling the hoppers with a quantity of product, setting the meter aperture, and then using a collection device for collecting the product released over a select distance at a select speed. Thereafter, the product collected by the collection device is weighed and the amount converted to mass per acre basis to determine the actual rate of application. If the spreader applies too much product, the size of the meter aperture needs to be decreased, and if the spreader applies too little product, then the size of the meter aperture needs to be increased. There are several variations of this method that are known and used to calibrate granular dispensers.

The calibration methods used today are time consuming and can be an added farming expense especially if a professional is hired to perform the calibration. Moreover, these calibration methods need to be performed each season to account for wear and tear of the dispensers to ensure accuracy as well as each time a different chemical formulation or product is dispensed. Accordingly, there is a need for an improved method for calibrating these conventional devices that not only ensures accuracy and is also less time consuming, but also permits farmers with the flexibility of calibrating the dispensers for different granular products and differing application speeds. The present invention is directed to meeting these needs.

SUMMARY OF THE INVENTION

According to the present invention, then, there is provided a tool or a set of tools adapted to calibrate a dispenser operative to dispense a selected granular material contained in the interior of a receptacle, such as a chemical hopper. The dispensers for which the tools are used generally include a housing having a discharge aperture formed therethrough in fluid communication with the interior of the receptacle, and a flow control member supported thereby and movable relative thereto between a first position for a maximum flow rate and a second position wherein the flow of granular material is prevented.

An aspect of the tool is a positioning element adapted to locate the flow control member at a selected position between the first and second positions thereby to set a desired delivery rate of the granular material to a designated area so as to calibrate it. The positioning element may have a length extending between a first end portion that may be generally rectangular in cross-section and a second end portion that may be generally semi-circular in cross-section wherein the length extending therebetween corresponds to a selected delivery rate. The positioning element is configured to locate the flow control member at a selected location so as to achieve the desired delivery rate. As such, it may be sized and adapted to be at least partially received in a Y-shaped opening that is formed in the flow control member so that when received therein, it limits movement thereof at a selected position between the first and second positions. In an alternative construction, for example, the positioning element may be sized and adapted to be at least partially received in the discharge aperture itself thereby to limit movement of the flow control member at the selected location.

The tool may be provided with a handle extending longitudinally from a first handle end to a second handle end along a longitudinal axis that is adapted to be grasped by a user. The positioning element may be configured as a protrusion, elongate projection or a flat blade, located proximately to the second handle end and extending upwardly therefrom along the longitudinal axis. The handle may further include a key hole formed through the handle at a location proximate to the first handle end. The positioning element and handle may be formed as an integral one-piece construction.

The tool may further be provided with a first flange portion and a second flange portion flanking either side of the positioning element and extending outwardly therefrom. Particularly, the flange portions may be interposed between the positioning element and the second handle end and extend perpendicularly to the longitudinal axis.

As contemplated, a plurality of tools may form a set of tools used to calibrate a selected dispenser. A ring, such as a key ring, may be provided through the key ring hole such as may be formed in the handle of the tools. Preferably the set of tools includes at least two tools preferably having positioning elements adapted to calibrate a selected dispenser at different delivery rates.

Another aspect of the present invention is a method of calibrating the delivery rate of a granular chemical applied to a target area from a granular dispenser having a discharge aperture. The steps of the method may generally include inserting a positioning element into an opening associated with the dispenser wherein the positioning element has a predetermined length. Then, advancing a flow control member supported by the dispenser and adapted to adjust the delivery rate thereof until further advancement is prevented by the positioning element. The opening in which the positioning element may be inserted may be, for example, the discharge aperture of the dispenser or may be an opening that is formed in the flow control member. The method may further include the step of inserting a second positioning element into the opening wherein the second positioning element has a different predetermined length so as to achieve a different delivery rate.

These and other aspects of the present invention will become more readily appreciated and understood from a consideration of the following detailed description of the exemplary embodiments when taken together with the accompanying drawings, in which:

DETAILED DESCRIPTION OF THE EXEMPLARY EMBODIMENTS

The present invention broadly concerns tools for calibrating granule dispensers, but has a particular applicability for calibrating granule dispensers commonly associated with large-scale agricultural equipment. These dispensers are typically used for dispensing chemicals formulated as granules, such as fertilizers, herbicides, fungicides insecticides, nematicides, and rodenticides. The tools shown and described provide an alternative way of calibrating these chemical dispensers that is more time efficient and cost efficient than the conventional trial and error method. The present invention also concerns a method of calibrating chemical dispensers using the tools.

Figure 1:
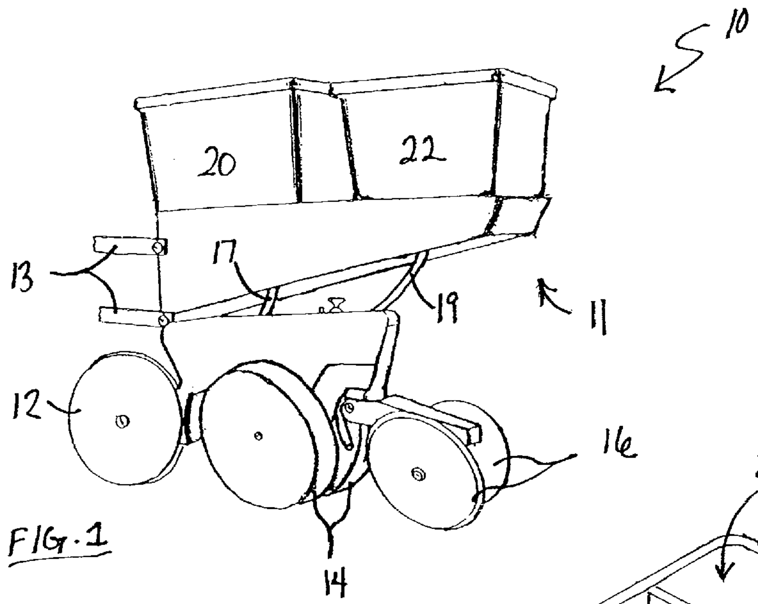
FIG. 1 is a perspective view of a conventional planter.

In order to understand the way in which the tools of the present invention calibrate dispensers, reference is first made to FIG. 1, which shows a conventional planter unit 10 that is a component of a spreader used for planting seeds. Typically, spreaders can include 4, 6, 8, 12, and even 16 planter units, which are drawn across fields by tractors. Planter unit 10 includes frame 11 movably supported by coulter 12, which breaks or loosens the soil, furrow forming discs 14, and closing wheels 16 to close the furrow. Planter unit 10 further includes parallel coupling bars 13, which connect the unit to the spreader (not shown). Frame 11 supports two receptacles in the form of seed hopper 20, which contains the seeds to be planted, and chemical hopper 22, which contains granular chemicals, such as fertilizers, herbicides, fungicides, and insecticides. The seeds and the granular chemicals contained in hoppers 20 and 22 are simultaneously delivered into the soil via seed discharge tube 17 and chemical discharge tube 19, respectively.

Figure 2:
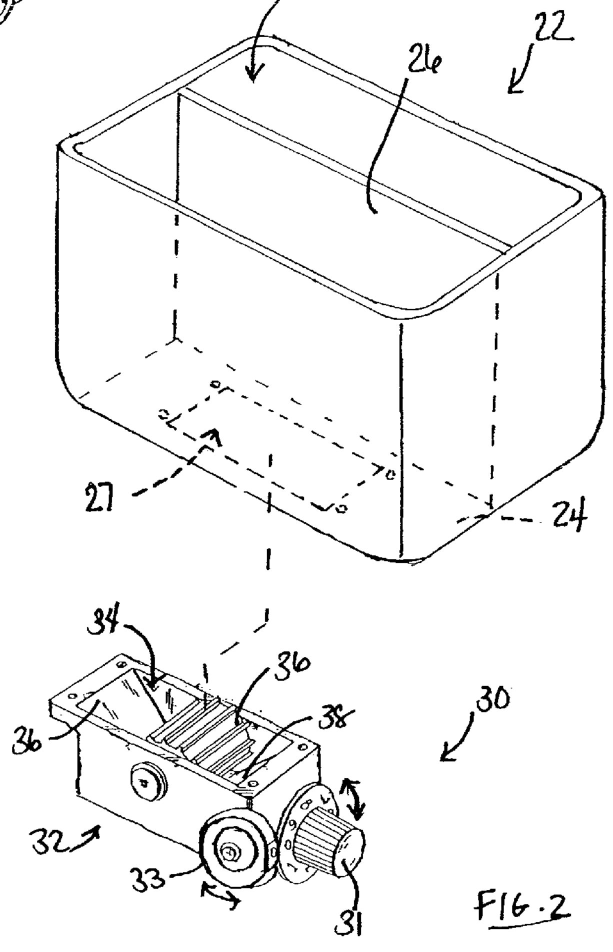
FIG. 2 is an exploded perspective view of a chemical hopper and a first type of granular dispenser associated therewith.
Figure 3:
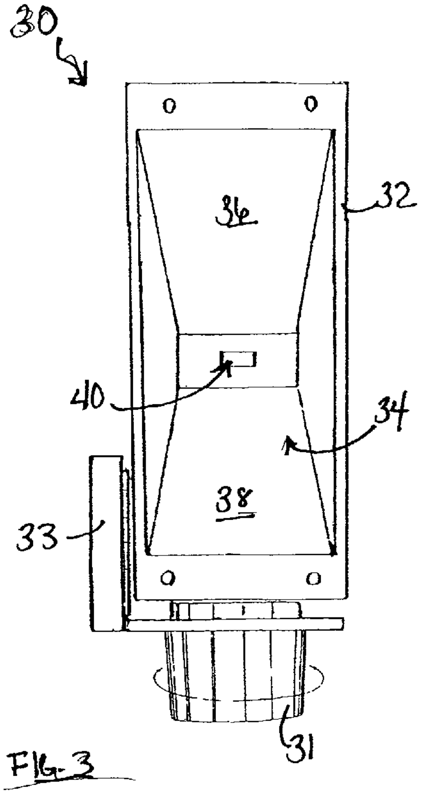
FIG. 3 is a top plan view of the granular dispenser shown in FIG. 2 without the roller.

With reference now to FIG. 2, chemical hopper 22 is shown here in the form of a dual hopper having partition wall 26, which separates the interior 21 of the hopper into two compartments so as to be able to receive and simultaneously dispense two different granular chemical products. The granular chemicals are dispensed from each compartment by means of two dispensers each releasably attached to bottom wall 24 of hopper 22. FIGS. 2 and 3 show a representative dispenser 30 which is in the form of a conventional chemical meter associated with John Deere equipment, the features of which are more fully described in U.S. Pat. No. 4,561,565, which issued on Dec. 31, 1982 to Wolf et al. (the '565 patent) and incorporated herein by reference.

Figure 4:
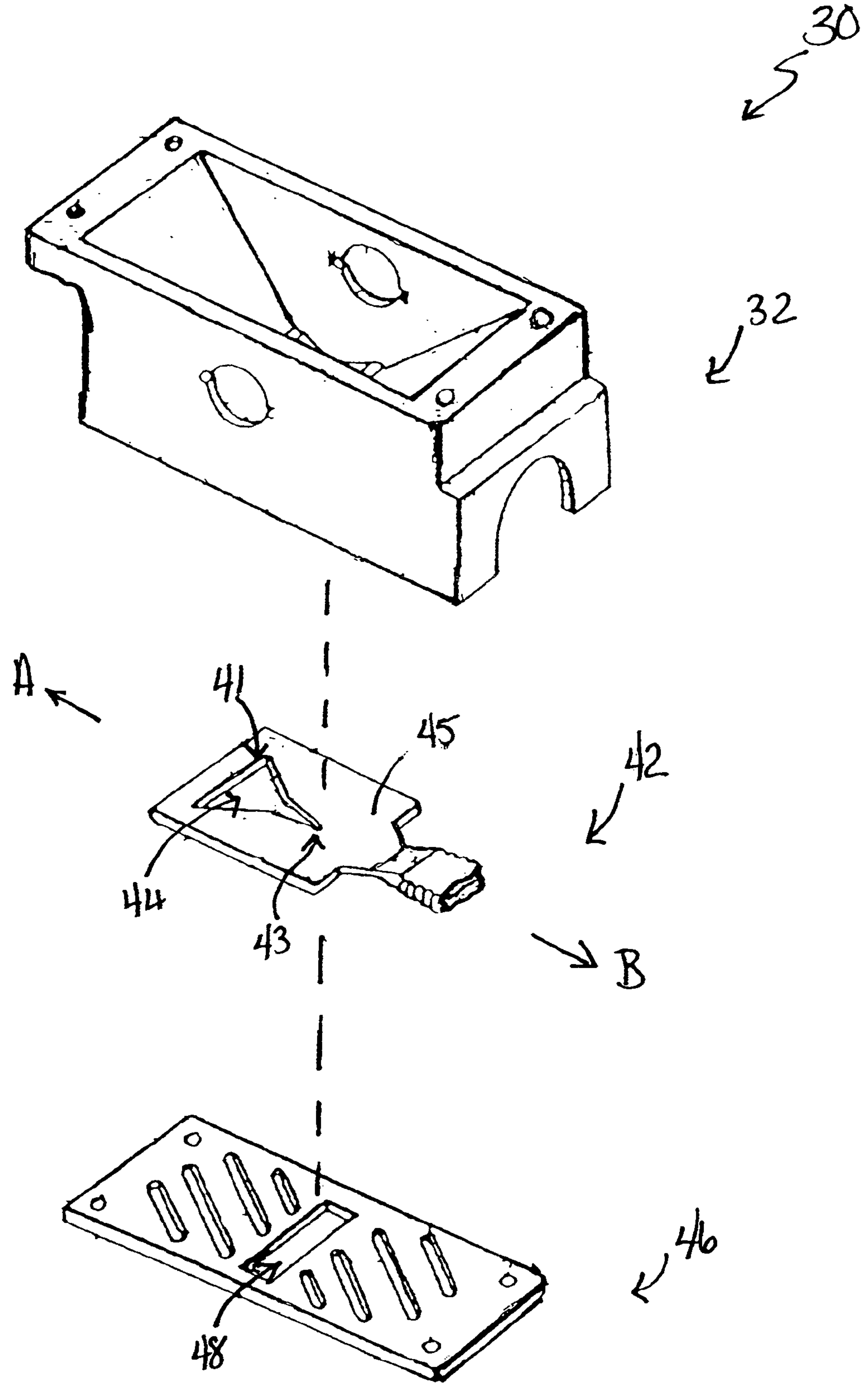
FIG. 4 is an exploded perspective view of the granular dispenser shown in FIGS. 2 and 3.
Figure 8:
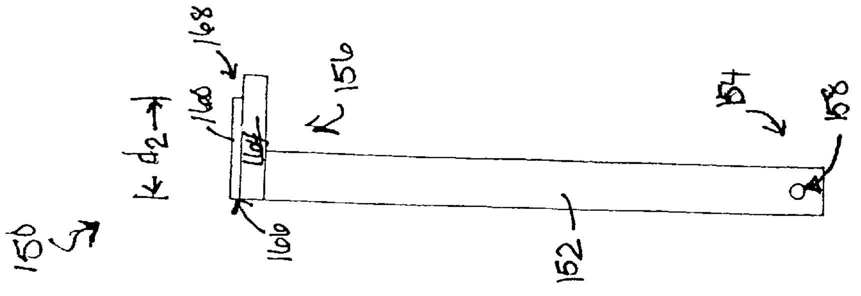
FIG. 8 is a side view of the tool shown in FIG. 7.
Figure 7:
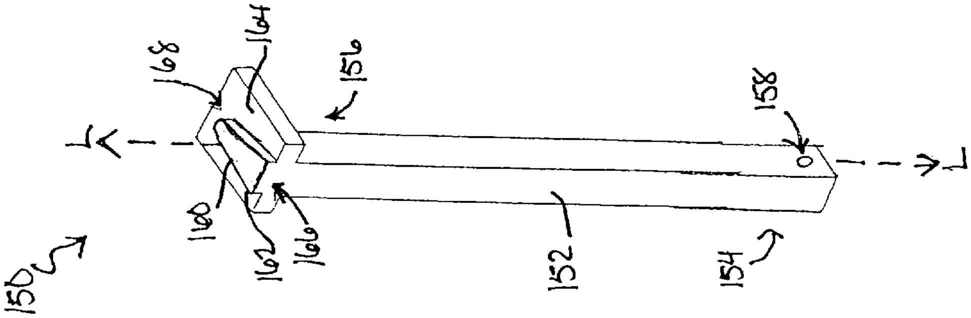
FIG. 7 is a perspective view of a tool according to a second exemplary embodiment of the present invention wherein the positioning element has a different selected length than that of the tool shown in FIGS. 5 and 6.
Figure 6:
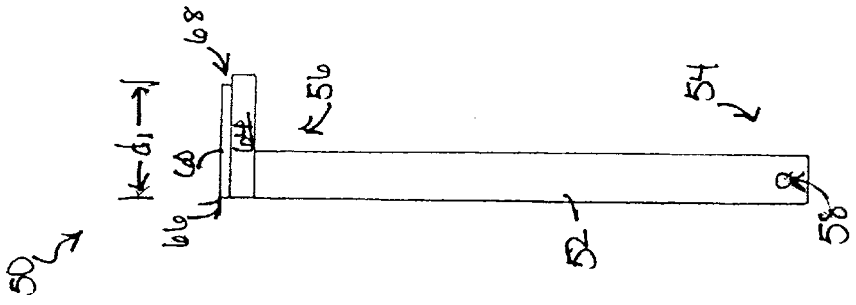
FIG. 6 is a side view in elevation of the tool shown in FIG. 5.
Figure 5:
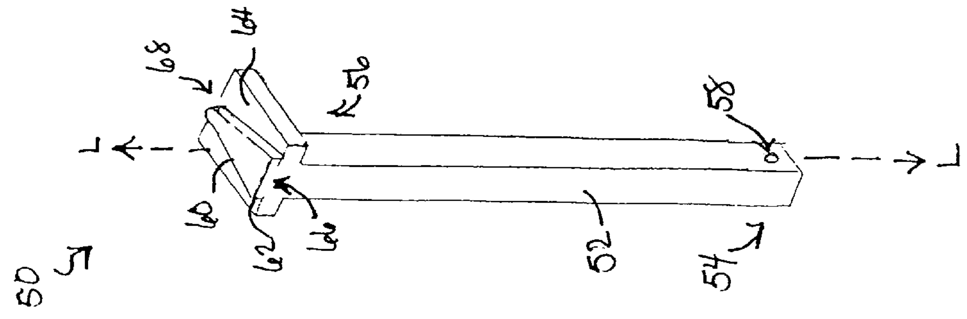
FIG. 5 is a perspective view of a tool according to a first exemplary embodiment of the present invention, which includes a positioning element of a selected length.

With continued reference to FIGS. 2 and 3, dispenser 30 generally includes housing 32 having an interior 34 and roller 36 disposed therein between two oppositely facing interior walls 36 and 38, which converge toward discharge aperture 40. As mentioned above, dispenser 30 is releasably secured to bottom wall 24 of hopper 22 and is in fluid communication with interior 21 through opening 27 formed therethrough. With additional reference now to FIG. 4, dispenser 30 includes flow control member 42, which includes panel 45 having Y-shaped opening 44 formed therethrough, and base plate 46 having passageway 48. As shown, Y-shaped opening extends between a first end portion 41 and narrower second end portion 43. Flow control member 42 is received in housing 32 and movable relative thereto between base plate 44 and the housing, again as more fully described in the '565 patent.

With this description in mind, when dispenser 30 is assembled, passageway 48 and discharge opening 40 are aligned with each other while flow control member 42 can be moved in the direction of either arrow "A" or arrow "B" (FIG. 4) using knobs 31 and 33 (FIGS. 2 and 3) between a first position, which is a fully open position to achieve maximum delivery rate, and a second position, which is a closed position wherein the flow of granular materials is minimized or even prevented. Generally, the widest end portion 41 of the Y-shaped opening is aligned with both passageway 48 and discharge opening 40 when flow control member 42 is in the first position. Then, when in the second position, panel 45 is positioned between passageway 48 and discharge opening 40 at a location proximate to the narrower second end portion 43 of the Y-shaped opening such that passageway 48 and discharge opening 40 are not in fluid communication with one another. As should be understood, flow control member 42 is movable between the first and second positions to selectively locate Y-shaped opening 44 anywhere between the widest portion 41 and narrowest portion 43, thereby to adjust the delivery rate of the dispenser.

Now that the components of dispenser 30 have been generally described, aspects of the tools according to a first and second exemplary embodiment of the present invention can be introduced with reference to FIGS. 5-8. Tools 50 and 150 each include handle 52, 152, which extend between first handle end 54, 154 and second handle end 56, 156 along longitudinal axis "L". Handles 52, 152 may be provided with key ring hole 58, 158 located proximate to the second handle end 54, 154, respectively. As will be discussed in more detail herein key ring hole 58, 158 may be received by a key ring or other connector adapted to connect two or more tools together.

Each tool 50, 150 includes positioning element 60, 160 located proximate to second handle end and may further be provided with first flange portions 62, 162 and second flange portions 64, 164, which extend perpendicularly to the longitudinal axis "L", flanking both sides of the positioning element. Positioning elements 60, 160 are generally configured as triangular, or Y-shaped protrusions that protrude upwardly from the flange portions and extend perpendicularly to the longitudinal axis "L". More particularly, positioning element 60 of tool 50 extends from first end portion 66 to second end portion 68, having a first selected length "$d_1$", while positioning element 160 of tool 150 extends between first end portion 166 and second end portion 168, having a second selected length "$d_2$", which is less than length "$d_1$". Preferably, the second end portions 68, 168 are generally semi-circular in cross-section and are similar in size to the semi-circular narrowest portion of Y-shaped opening.

Tools 50 and 150 may be formed as an integral one-piece construction of a mixture containing 40% glass polypropylene and formed using production technology such as injection molding, blow molding or similar process. However, the tools of the present invention are not limited to this construction and it is contemplated that these tools may be formed from other suitable materials such as wood, plastics, metal, or a combination thereof. It should further be appreciated that the handle, flange portions, and positioning elements of each tool is not limited to an integral one-piece construction, but may alternatively be constructed as separate, connectable pieces.

As described above with reference to FIGS. 5-8, tools 50 and 150 are similar in structure, the difference between them being the length, $d_1$ and $d_2$, of the respective positioning elements. As will now be understood, the length of the positioning elements dictates the delivery rate of the dispenser.

Figure 9:
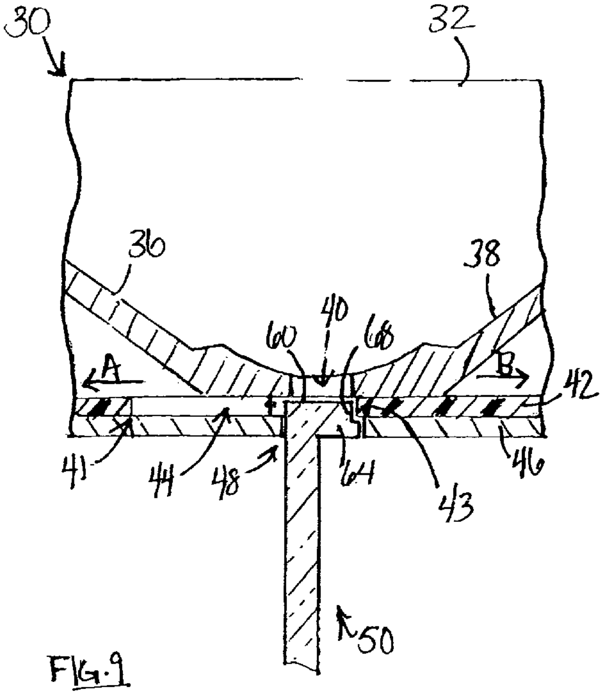
FIG. 9 is a partial cross-section of the dispenser shown in FIGS. 2 and 3 being calibrated by the tool shown in FIGS. 5 and 6.
Figure 10:
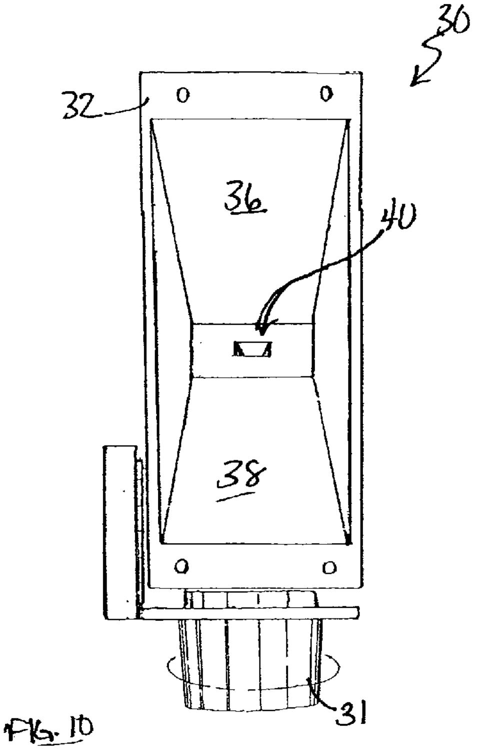
FIG. 10 is a top plan view of the dispenser showing the effective discharge area of the discharge aperture after calibration by the tool shown in FIGS. 5 and 6.

Turning then to FIGS. 9 and 10, tool 50 is used to calibrate dispenser 30 (shown without roller). As assembled, interior walls 36 and 38 converge toward discharge aperture 40, which is aligned with passageway 48 of base plate 46. Flow control member 42 is located between housing 32 and base plate 46 and movable therebetween in the direction of either arrow "A" or arrow "B".

Calibrating dispenser 30 to achieve a desired delivery rate requires specifically locating Y-shaped opening 44 between the first and second positions thereby to manipulate the size of the corridor between discharge aperture 40 and passageway 48 formed when aligned. To calibrate dispenser 30, tool 50 is inserted through passageway 48 in the base plate. When properly inserted, flange portions, such as flange portion 64, confront both sides of passageway 48, positioning element 60 is received at least partly by Y-shaped opening 44, with first end portion 66 facing wide portion 41 of Y-shaped opening 44 and second end portion 68 facing narrow end portion 43. Once tool 50 is inserted, flow control member 42 is advanced using knob 31 until second end portion 68 of positioning element 60 confronts narrowest portion 43 of the Y-shaped opening, which are of similar size and geometry as described above. Subsequently, tool 50 is removed from dispenser 30, leaving flow control member 42 at the selected location. As perhaps best shown in FIG. 10, discharge aperture 40 is, in essence, reduced in size by the location of the Y-shaped opening.

Figure 11:
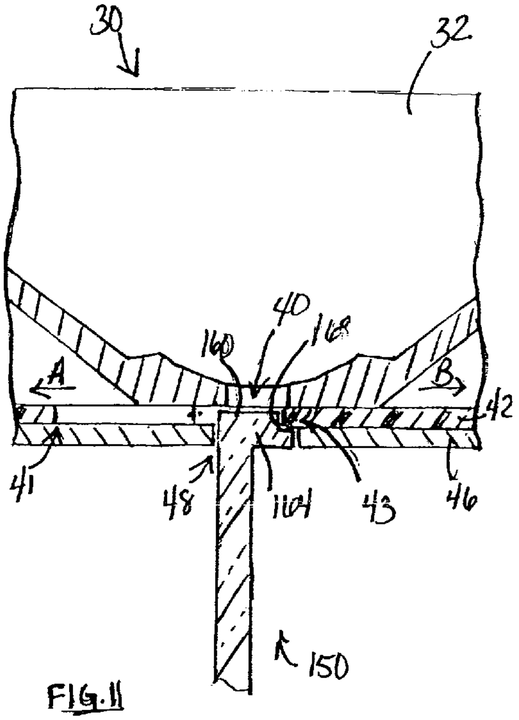
FIG. 11 is a partial cross-section of the dispenser shown in FIGS. 2 and 3 being calibrated by the tool shown in FIGS. 7 and 8.
Figure 12:
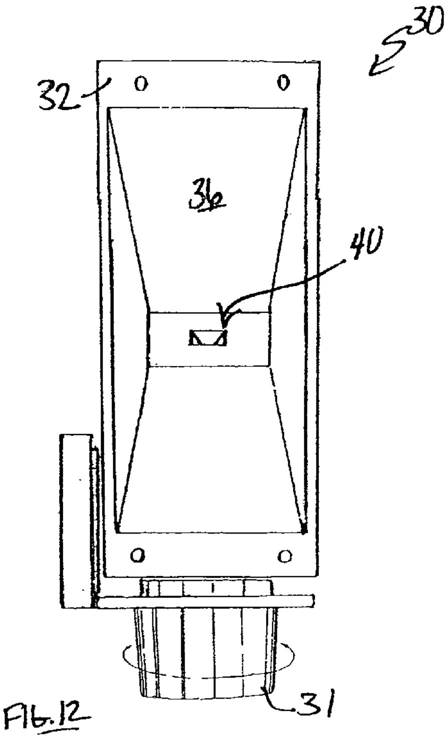
FIG. 12 is a top plan view of the dispenser showing the effective discharge area of the discharge aperture after calibration by the tool shown in FIGS. 7 and 8.

Turning to FIGS. 11 and 12, tool 150 is next used to calibrate dispenser 30. Since the size of positioning element 160 is shorter in length ($d_2$ shown in FIG. 8) than that of tool 50 ($d_1$ shown in FIG. 6), flow control member 42 will necessarily be located at a different location between the first and second positions thereby to calibrate the dispenser at a different desired delivery rate. As shown, tool 150 is inserted through passageway 48 such that flange portions, such as flange portion 164, confronts both sides thereof and positioning element 160 is at least partly received in Y-shaped opening 44, with first end portion 166 facing wide portion 41 of Y-shaped opening 44 and second end portion 168 facing narrow end portion 43. Flow control member 42 is advanced by turning knob 31 until second end portion 168 of positioning element 160 confronts narrowest portion 43 of the Y-shaped opening thereby locating flow control member 42 at a location that, as perhaps best shown in FIG. 12, reduces the size of discharge opening 40.

When FIGS. 10 and 12 are compared, it should now be appreciated that it is the length of the positioning element of tools 50 and 150, respectively, which determines the location of the flow control member, and ultimately the size of discharge opening 40. For the purposes of determining the appropriate length of the positioning element for use with a particular dispenser, it needs to be calibrated, for example, by any known technique such as the trial and error method discussed above in the Background of the Invention section of the application. Once calibrated, the size of the opening is measured, which corresponds to the length of the positioning element.

Figure 13:
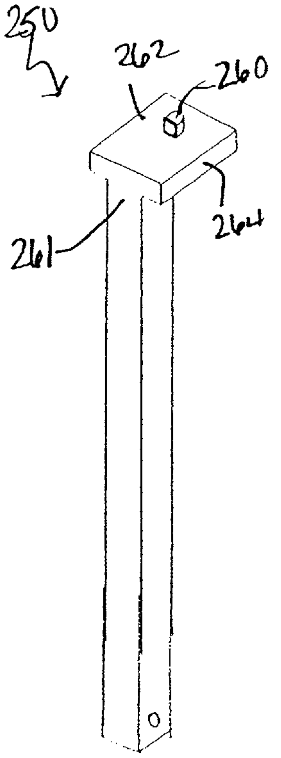
FIG. 13 is a perspective view of a third exemplary embodiment of the tool according to the present invention.
Figure 14:
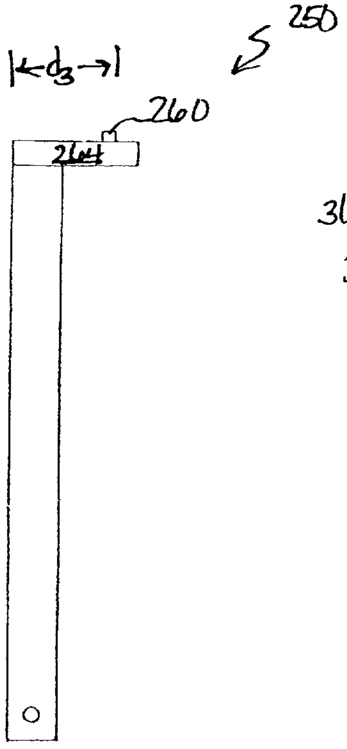
FIG. 14 is a side view in elevation of the tool shown in FIG. 13.

The positioning element need not be limited to the triangular protrusion shown and described above with respect to FIGS. 5-8 to calibrate the dispenser having a flow control member with a Y-shaped opening. An alternative construction of a positioning element for this type of dispenser may be in the form of nub-like projection 260 shown in FIGS. 13 and 14. With the exception of positioning element 260, tool 250 has the same construction as tool 150 shown in FIGS. 7 and 8. Positioning element 260 extends upwardly from flange portions 262 and 264 sufficient to be at least partly received by the Y-shaped opening and be stopped thereby when the flow control member is advanced. Positioning element 260 is spaced a select distance $d_3$ from back side 261 of tool 250 such that when inserted into an assembled dispenser in the manner shown in FIGS. 9 and 10, flange members 262 and 264 will confront either side of the passageway in the base plate and positioning element 260 will be at least partly received by the Y-shaped opening in the flow control member. As the flow control member is moved between the base plate, it will be stopped by positioning element 260 at the desired location between the first and second positions to achieve the desired delivery rate.

Figure 15:
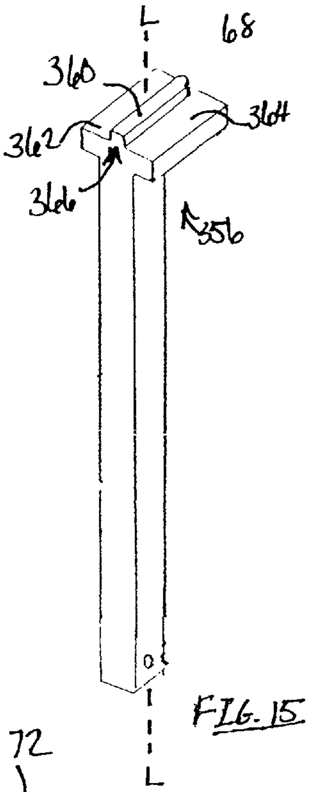
FIG. 15 is a perspective view of a fourth exemplary embodiment of the tool according to the present invention.

FIG. 15 shows another possible positioning element configuration. Again, positioning element 360 is located proximate to second handle end 356 and is flanked by first flange portion 362 and second flange portion 364. Here, positioning element 360 is configured as an elongated protrusion that protrudes upwardly from the flange portions and extend perpendicularly to the longitudinal axis "L". The first end portion 366 is generally rectangular in cross-section while second end portion 368 is generally semi-circular in cross-section. The length of positioning element determines the location of the flow control member, and ultimately the delivery rate of the dispenser. Other suitable configurations, which are capable of locating the Y-shaped opening at a selected location to attain a desired delivery rate are also contemplated.

Figure 16:
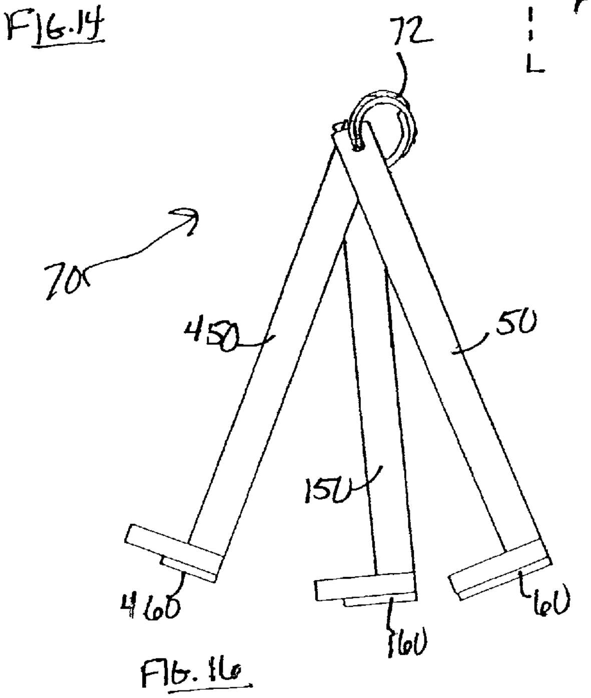
FIG. 16 is a set of tools each having a positioning element of a different length and each joined together by a key ring.

Set of tools 70 as shown in FIG. 16 is also contemplated by the present invention. Preferably, a set of tools would include at least two tools adapted to calibrate a selected dispenser at different delivery rates. As shown here, set of tools 70 includes three (3) tools 50, 150 and 450, each having positioning element 60, 160, and 460, respectively, of different lengths that are joined together by key ring 72. Key ring 72 is inserted through the key holes formed in the tool handles such as discussed above with respect to FIGS. 5-8. Set of tools 70 allows the user to calibrate the dispenser for a particular granular chemical product at a selected speed. For example, tool 50 may be the appropriate tool for calibrating the dispenser for a speed of 7.5 mph while tool 450 is the appropriate tool for calibrating the dispenser for a tractor speed of 6.0 mph. Further, appropriate indicia could be written or otherwise placed on the handles or any other portion of the tool to identify the delivery rate that corresponds to the tools as well as the selected dispenser. Alternatively, the use of colors on any portion of the tools could be used so that the appropriate tool is used for the selected dispenser at the desired delivery rate.

Figure 17:
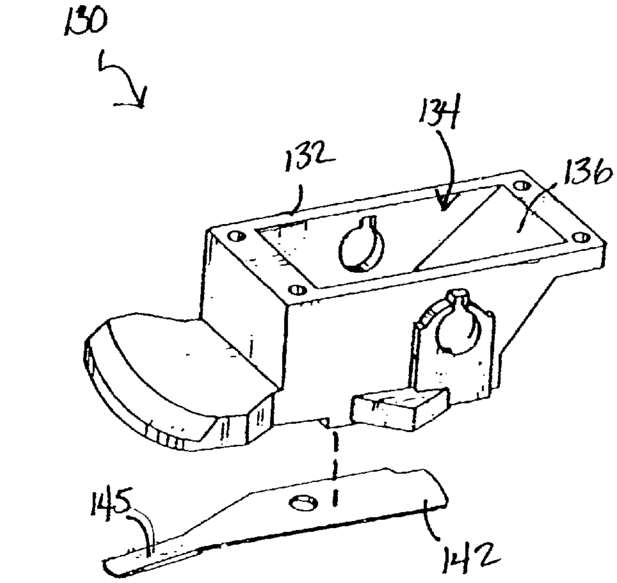
FIG. 17 is a perspective exploded view of a second type of granular dispenser.
Figure 18:
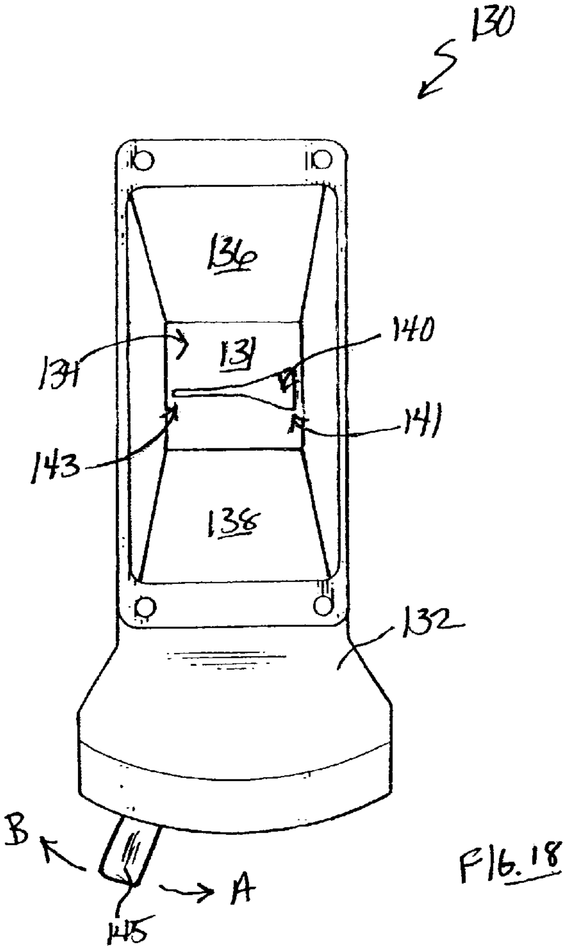
FIG. 18 is a top plan view of the granular dispenser shown in FIG. 17 without the roller.
Figures 19, 20, 21, 22:
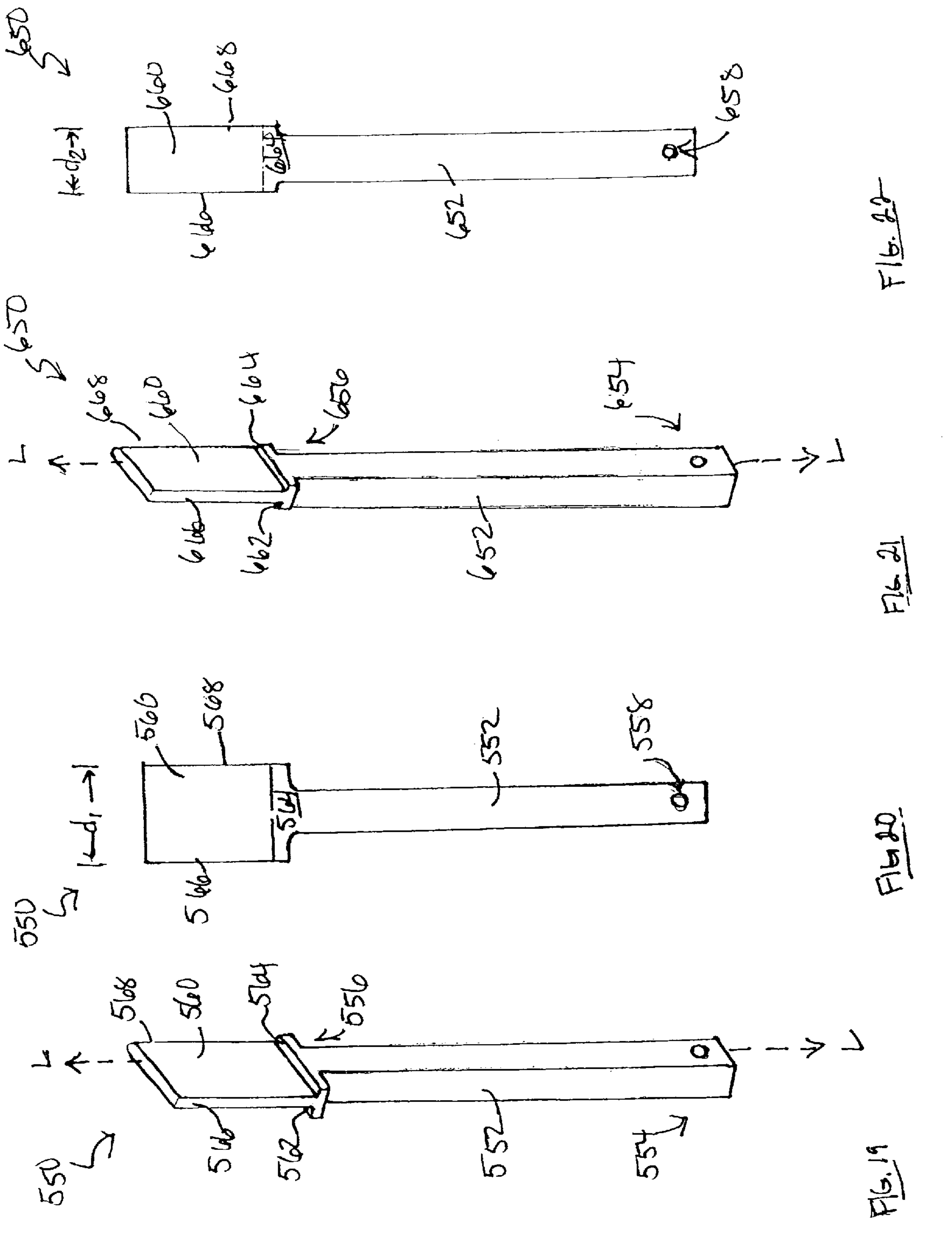
FIG. 19 is a perspective view of a tool according to a fourth exemplary embodiment of the present invention wherein the positioning element is in the form of a blade having a selected length.
FIG. 20 is a side view in elevation of the tool shown in FIG. 19.
FIG. 21 is a perspective view of a tool according to a fifth exemplary embodiment of the present invention wherein the positioning element is in the form of a blade having a different selected length than that of the tool shown in FIGS. 19 and 20.
FIG. 22 is a side view in elevation of the tool shown in FIG. 20.

An alternative conventional dispenser 130 is shown in FIGS. 17 and 18, which is also operative to dispense granular chemical materials from a hopper at selected delivery rates. Dispenser 130 generally includes housing 132 having an interior 134 adapted to be in fluid communication with the interior of a hopper and sized to receive a roller (not shown) therein. Housing 132 includes two oppositely facing interior walls 136 and 138 that converge toward discharge aperture 140 formed through end wall 131. Discharge aperture 140 is generally Y-shaped in configuration and narrowing from a relatively wide portion 141 to a rounded end portion 143.

Flow control member 142 is supported by housing 132 and movable relative thereto by grasping handle end 145 and moving it in the direction of either arrow "A" or arrow "B" between a first position wherein the dispenser is set at a maximum delivery rate and a second position wherein the flow of the granular materials is prevented. Flow control member 142 can be selectively located between the first and second positions to set a desired delivery rate of granular materials. In essence, flow control member 142 is sized and adapted to cover a select area of the discharge aperture, which ultimately affects the size of the discharge aperture available for the passage of the granules. Accordingly, as more area is covered by the flow control member, the size of the discharge aperture decreases. Similarly, as less area is covered by the flow control member, the larger the size of the discharge aperture.

Turning then to FIGS. 19-22 additional exemplary embodiments of the tools according to the present invention are shown. Tools 550 and 650 are configured to set different desired delivery rates for a granular chemical dispenser having the construction generally shown and described above with respect to FIGS. 17 and 18. Tools 550 and 650 have several structural features in common. Each include respective handles 552, 652, which extend between first handle ends 554, 654 and second handle ends 556, 656 along longitudinal axis "L". Handles 552, 652 may, if desired, be provided with key ring hole 558, 658 located proximate to the second handle end 554, 654, respectively, which serve the same purpose described above.

Each tool 550, 650 also includes positioning element 560, 660 located proximate to respective second handle ends 556 and 656 having first flange portions 562, 662 and second flange portions 564, 664, which extend perpendicularly to the longitudinal axis "L", flanking both sides of the positioning element. Both positioning elements 560, 660 are configured as flat blades that extend upwardly from the second handle portion along longitudinal axis "L" and have a length extending between two end portions, wherein the first end portion is rectangular in cross-section and the second end portion is semi-circular in cross-section.

The difference between tools 550 and 650 is the length of the respective positioning elements, which ultimately dictates the delivery rate of the dispenser when used for calibration. Taking each tool in turn, positioning element 560 of tool 550 extends a length of "$d_1$" perpendicularly to longitudinal axis "L" between first end portion 566 and second end portion 568. Positioning element 660 of tool 650, on the other hand, extends a length "$d_2$" between first end portion 666 and second end portion 668. Length "$d_2$" is less than the length "$d_1$".

Figure 23:
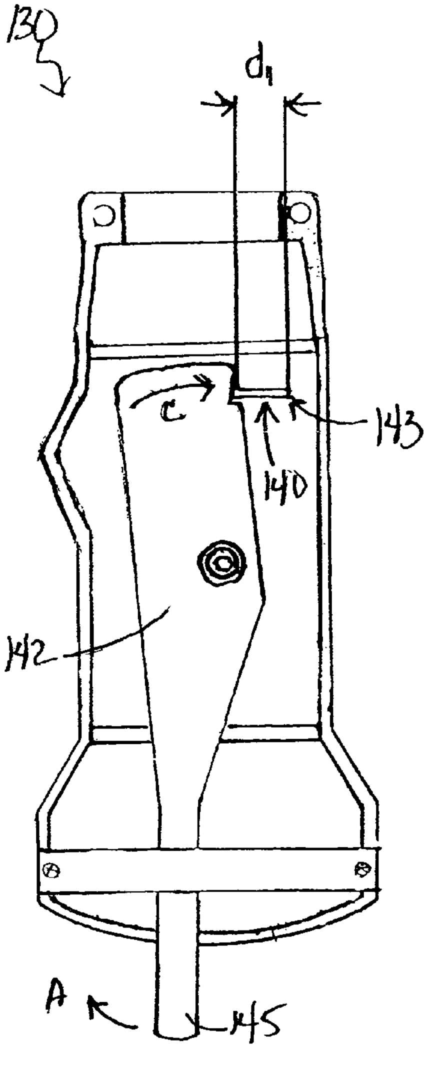
FIG. 23 is a bottom view in elevation of the second type of dispenser showing the effective discharge area of the discharge aperture after calibration by the tool shown in FIGS. 19 and 20.
Figure 24:
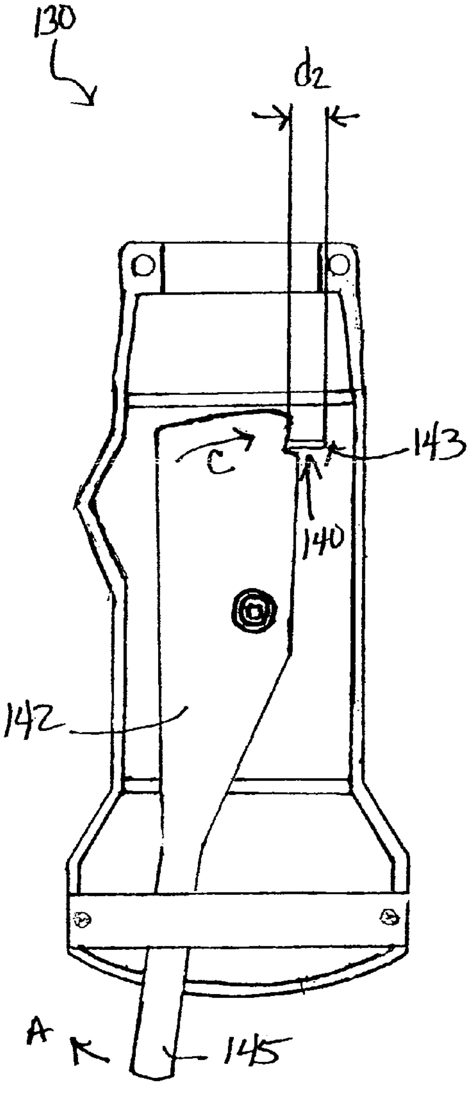
FIG. 24 is a bottom view in elevation of the second type of dispenser showing the effective discharge area of the discharge aperture after calibration by the tool shown in FIGS. 21 and 22.

Tools 550 and 650 were used to calibrate dispenser 130 shown in FIGS. 23 and 24, respectively. With reference to FIG. 23 and additional reference to FIGS. 19 and 20, dispenser 130 was calibrated by inserting positioning element 560 at least partially into discharge aperture 140 and oriented so that semi-circular shaped second end portion 568 confronts rounded end portion 143. Once positioning element is inserted, handle end 145 is moved in the direction of arrow "A", causing flow control member 142 to move along arcuate path "C" from the wide portion of the aperture toward the rounded end portion 143 until movement is stopped by the positioning element. Once tool 550 is removed from discharge aperture 140, the area thereof that is not covered by flow control member 142 is the length $d_1$, which is the length of positioning member 560 and corresponds to a specific delivery rate.

Dispenser 130 shown in FIG. 24 was calibrated with tool 650 in the same manner as that described with reference to FIG. 23. First, positioning element 660 is inserted into discharge aperture 140 and oriented therein so that second end portion 668 confronts rounded end portion 143 of the aperture. Handle end 145 is then moved in the direction of arrow "A" causing flow control member 142 to move along arcuate path "C" from the wide portion of the aperture toward the rounded end portion 143 until stopped by the positioning element so that when removed, the area of the aperture that is not covered by flow control member 142 has a length $d_2$, which is equal in length to positioning element 660.

The calibration tools are not limited to the configurations herein described or limited to use with the granular dispensers shown and discussed above. Rather, it is contemplated that tools can be appropriately configured for any chemical granular dispenser, or even non-chemical granular dispensers such as seed dispensers. As contemplated, then, calibration tools would be provided with appropriately configured positioning elements used to set the dispenser at a desired delivery rate. A set of tools corresponding to different delivery rates and different speeds could also be formed for a particular dispenser so as to permit the calibration of the dispenser at various delivery rates.

From the foregoing, also, it should be appreciated that the present invention also contemplates a method of calibrating the delivery rate of a granular dispenser such as the two types shown and described above. This method may include inserting a positioning element of a predetermined length into an opening associated with the dispenser, such as the discharge aperture itself, or an opening formed in the flow control member, and, subsequently, advancing the flow control member until it is stopped by the positioning element. The method may further include the step of calibrating the dispenser at a second delivery rate by inserting a second positioning element of a different length into the opening.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A set of hand-held tools adapted to calibrate a granular chemical meter operative to dispense granular chemicals from a planter hopper having an interior, said chemical meter including a housing having a discharge aperture formed therethrough in fluid communication with the hopper interior and a flow control member supported by said housing and movable relative thereto between a first position for a maximum flow rate and a second position wherein the flow of said granular material is prevented, each one of said tools comprising:

(A) a handle extending longitudinally from a first handle end to a second handle end along a longitudinal axis and adapted to be grasped by a user; and (B) a positioning element extending forwardly of said handle proximate to said second handle end and adapted to locate said flow control member at a selected position between the first and second positions so as to calibrate the dispenser to dispense the granular chemical at a desired delivery rate for a designated area.

2. A set of hand-held tools according to claim 1 wherein each one of said positioning elements has a length that extends perpendicular to the longitudinal axis between:

(A) a first end portion that is generally rectangular in cross-section;

(B) a second end portion that is generally semi-circular in cross-section; and (C) wherein the length therebetween corresponds to a selected delivery rate.

3. A set of hand-held tools according to claim 1 wherein said positioning element is configured as a protrusion.

4. A set of hand-held tools according to claim 3 wherein said flow control member has a Y-shaped opening formed therethrough that is aligned with the discharge aperture, and wherein said protrusion is sized to be at least partially received in the Y-shaped opening and adapted to limit movement of said flow control member at a selected position between the first and second positions.

5. A set of hand-held tools according to claim 1 wherein each one of said positioning elements is in the form of a blade.

6. A set of hand-held tools according to claim 5 wherein said blade is sized and adapted to be at least partially received in the discharge aperture and limit movement of said flow control member at a selected position between the first and second positions.

7. A set of hand-held tools according to claim 1 including a first flange portion and a second flange portion each said portion extending perpendicularly to the longitudinal axis and interposed between said second handle end and said positioning element.

8. A set of hand-held tools according to claim 7 wherein each one of said positioning elements, said first and second flange portions, and said handle are formed as an integral one-piece construction.

9. A set of hand-held tools according to claim 1 wherein each of said handles includes a hole formed therethrough and located proximately to said first handle end.

10. A set of hand-held tools according to claim 9 including a ring received in the hole and adapted to join each of said tools together.

11. A set of hand-held tools according to claim 1 including at least two tools wherein each respective positioning element is adapted to calibrate the dispenser at a different desired delivery rate.

12. A set of hand-held tools according to claim 1 including six tools wherein each respective positioning element is adapted to calibrate the dispenser at a different desired delivery rate.

13. A method of calibrating the delivery rate of a granular chemical applied to a target area from a granular dispenser having a discharge aperture, comprising the steps of:

(A) inserting a positioning element into an opening associated with said dispenser wherein said positioning element has a predetermined length; and (B) advancing a flow control member supported by said dispenser and adapted to adjust the delivery rate thereof until further advancement is prevented by said positioning element.

14. A method according to claim 13 wherein said positioning element is inserted directly into the discharge aperture of said dispenser.

15. A method according to claim 13 wherein the opening in which said positioning element is inserted is formed in said flow control member.

16. A method a according to claim 13 including the step of inserting a second positioning element into the opening wherein said second positioning element has a different predetermined length so as to achieve a different delivery rate.

17. A tool adapted to calibrate a dispenser operative to dispense a selected granular material contained in the interior of a receptacle, said dispenser including a housing having a discharge aperture formed therethrough in fluid communication with the interior of said receptacle and a flow control member supported by said housing and movable relative thereto between a first position for a maximum flow rate and a second position wherein the flow of said granular material is minimized, said tool comprising:

(A) a handle extending longitudinally from a first handle end to a second handle end along a longitudinal axis;

(B) a positioning element located proximately to said second handle end and adapted to locate said flow control member at a selected position between the first and second positions thereby to set a desired delivery rate of the granular material; and (C) a first flange portion and a second flange portion which flank either side of said positioning element and extend outwardly therefrom.

18. A tool adapted to calibrate a dispenser operative to dispense a selected granular material contained in the interior of a receptacle, said dispenser including a housing having a discharge aperture formed therethrough in fluid communication with the interior of said receptacle and a flow control member supported by said housing and movable relative thereto between a first position for a maximum flow rate and a second position wherein the flow of said granular material is minimized, said tool comprising:

(A) a handle extending longitudinally from a first handle end to a second handle end along a longitudinal axis;

(B) a positioning element located proximately to said second handle end and adapted to locate said flow control member at a selected position between the first and second positions thereby to set a desired delivery rate of the granular material; and (C) wherein said flow control member has a Y-shaped opening formed therethrough that is aligned with the discharge aperture, said positioning element configured to be at least partially received in the Y-shaped opening so as to limit movement thereof at a selected position between the first and second positions.

19. A tool adapted to calibrate a dispenser operative to dispense a selected granular material contained in the interior of a receptacle, said dispenser including a housing having a discharge aperture formed therethrough in fluid communication with the interior of said receptacle and a flow control member supported by said housing and movable relative thereto between a first position for a maximum flow rate and a second position wherein the flow of said granular material is minimized, said tool comprising:

(A) a handle extending longitudinally from a first handle end to a second handle end along a longitudinal axis;

(B) a positioning element located proximately to said second handle end and adapted to locate said flow control member at a selected position between the first and second positions thereby to set a desired delivery rate of the granular material; and (C) wherein said positioning element is sized and adapted to be at least partially received in the discharge aperture and limit movement of said flow control member at a selected position between the first and second positions.

20. A tool adapted to calibrate a dispenser operative to dispense a selected granular material contained in the interior of a receptacle, said dispenser including a housing having a discharge aperture formed therethrough in fluid communication with the interior of said receptacle and a flow control member supported by said housing and movable relative thereto between a first position for a maximum flow rate and a second position wherein the flow of said granular material is minimized, said tool comprising:

(A) a handle extending longitudinally from a first handle end to a second handle end along a longitudinal axis;

(B) a positioning element located proximately to said second handle end and adapted to locate said flow control member at a selected position between the first and second positions thereby to set a desired delivery rate of the granular material; and (C) wherein said positioning element is formed as a flat blade that extends upwardly generally along the longitudinal axis.

* * * * *